US010489976B2

(12) United States Patent
Jin et al.

(10) Patent No.: US 10,489,976 B2
(45) Date of Patent: Nov. 26, 2019

(54) INCIDENT SITE INVESTIGATION AND MANAGEMENT SUPPORT SYSTEM BASED ON UNMANNED AERIAL VEHICLES

(71) Applicants: Jing Jin, Basking Ridge, NJ (US); Bobby Ouyang, Cranbury, NJ (US); Seyedamirali Mostafavizadeh Ardestani, Hamilton, NJ (US); Yizhou Wang, Highland Park, NJ (US); Xiaowen Jiang, Piscataway, NJ (US); Tianya Zhang, Piscataway Township, NJ (US)

(72) Inventors: Jing Jin, Basking Ridge, NJ (US); Bobby Ouyang, Cranbury, NJ (US); Seyedamirali Mostafavizadeh Ardestani, Hamilton, NJ (US); Yizhou Wang, Highland Park, NJ (US); Xiaowen Jiang, Piscataway, NJ (US); Tianya Zhang, Piscataway Township, NJ (US)

(*) Notice: Subject to any disclaimer, the term of this patent is extended or adjusted under 35 U.S.C. 154(b) by 0 days.

(21) Appl. No.: 16/101,535

(22) Filed: Aug. 13, 2018

(65) Prior Publication Data
US 2019/0051046 A1 Feb. 14, 2019

Related U.S. Application Data

(60) Provisional application No. 62/544,461, filed on Aug. 11, 2017.

(51) Int. Cl.
*G06F 21/30* (2013.01)
*G06T 17/20* (2006.01)
(Continued)

(52) U.S. Cl.
CPC .............. *G06T 17/20* (2013.01); *G06F 21/30* (2013.01); *G06F 21/602* (2013.01); *G06Q 40/08* (2013.01);
(Continued)

(58) Field of Classification Search
CPC ....... G06T 17/20; G06T 7/0002; G06T 17/05; G06T 19/20; G06T 2207/30236;
(Continued)

(56) References Cited

U.S. PATENT DOCUMENTS 9,505,494 B1 * 11/2016 Marlow ................ B64C 39/024
9,643,722 B1 * 5/2017 Myslinski ............. B64C 39/024
(Continued)

*Primary Examiner* — Hung T Nguyen
(74) *Attorney, Agent, or Firm* — Cognition IP, P.C.; Bryant Lee

(57) ABSTRACT

Systems and methods allow for incident data collection and management system based on unmanned aerial vehicles (UAVs), that is, drones to help accelerate the data collection and analytics, information dissemination, and decision support at incident sites. The system architecture may include onsite, server, and offline components including flight planning subsystem, flight execution and mission control subsystem, information dissemination subsystem to travelers and traveler information services, the interface with traffic management center, and the data analytic, visualization, and training subsystems. Other embodiments include the video-based 3D incident site reconstruction methods, site positioning and scaling methods with pre-collected static background infrastructure data, data management and user charging methods, and training methods with the generated 3D model.

24 Claims, 9 Drawing Sheets
(7 of 9 Drawing Sheet(s) Filed in Color)

Flight Path Planning and Control Methods

(51) Int. Cl.
| | |
|---|---|
| H04N 5/232 | (2006.01) |
| G06T 7/00 | (2017.01) |
| G08G 5/04 | (2006.01) |
| G08G 1/09 | (2006.01) |
| G06T 17/05 | (2011.01) |
| G06T 19/20 | (2011.01) |
| G08G 5/00 | (2006.01) |
| G06F 21/60 | (2013.01) |
| G06Q 40/08 | (2012.01) |
| G09B 5/06 | (2006.01) |

(52) U.S. Cl.
CPC ............ *G06T 7/0002* (2013.01); *G06T 17/05* (2013.01); *G06T 19/20* (2013.01); *G08G 1/091* (2013.01); *G08G 5/0034* (2013.01); *G08G 5/0069* (2013.01); *G08G 5/045* (2013.01); *G09B 5/065* (2013.01); *H04N 5/23203* (2013.01); *H04N 5/23296* (2013.01); *H04N 5/23299* (2018.08); *G06T 2200/08* (2013.01); *G06T 2207/10016* (2013.01); *G06T 2207/10032* (2013.01); *G06T 2207/30168* (2013.01); *G06T 2207/30236* (2013.01); *G06T 2219/2004* (2013.01); *G06T 2219/2016* (2013.01)

(58) Field of Classification Search
CPC ... H04N 5/23299; G06F 21/30; G06F 21/602; G06Q 40/08; G08G 1/091; G08G 5/0034; G08G 5/00069; G08G 5/0069
USPC ................................ 340/539.13, 905; 701/3
See application file for complete search history.

(56) References Cited

U.S. PATENT DOCUMENTS 10,185,316 B2 * 1/2019 Kablaoui ............ G05D 1/0022
2016/0364989 A1 * 12/2016 Speasl ................ G08G 5/0034

* cited by examiner

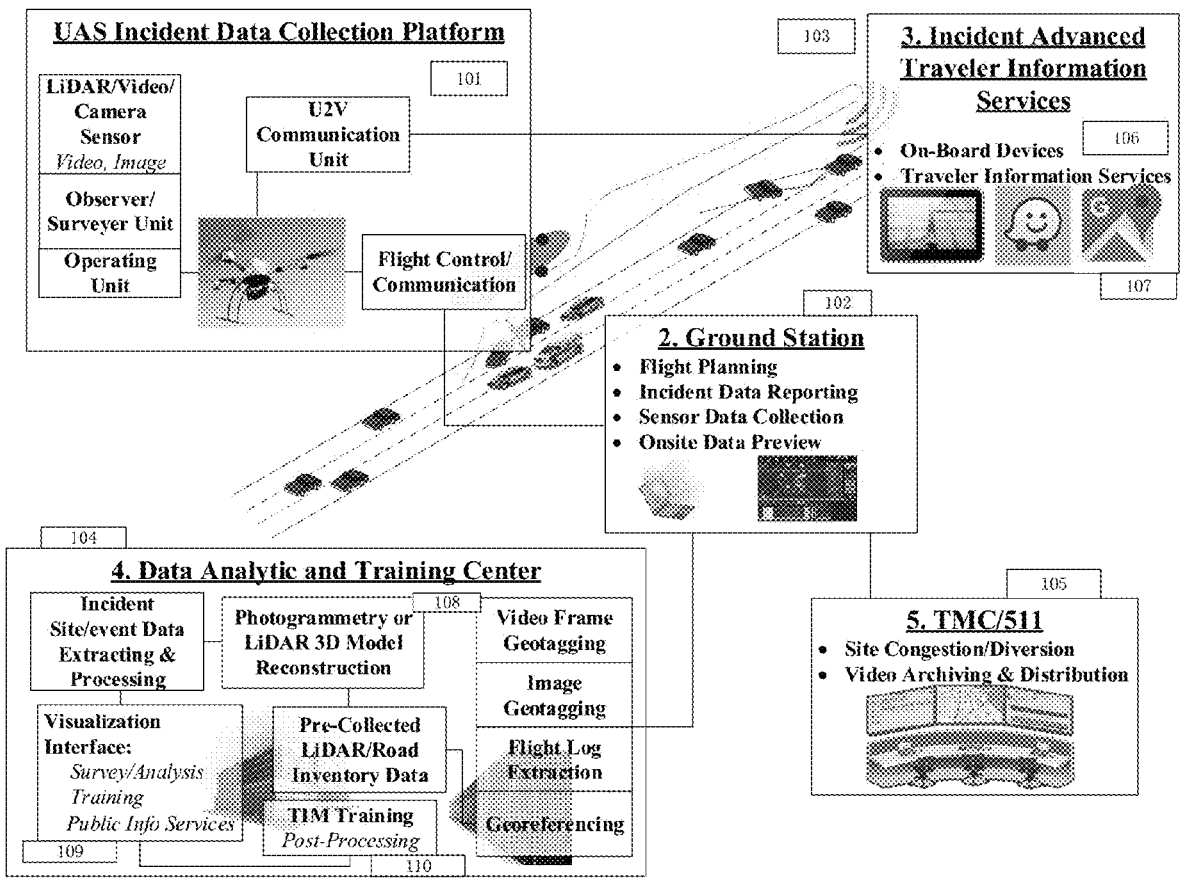
FIG. 1. Flight Path Planning and Control Methods

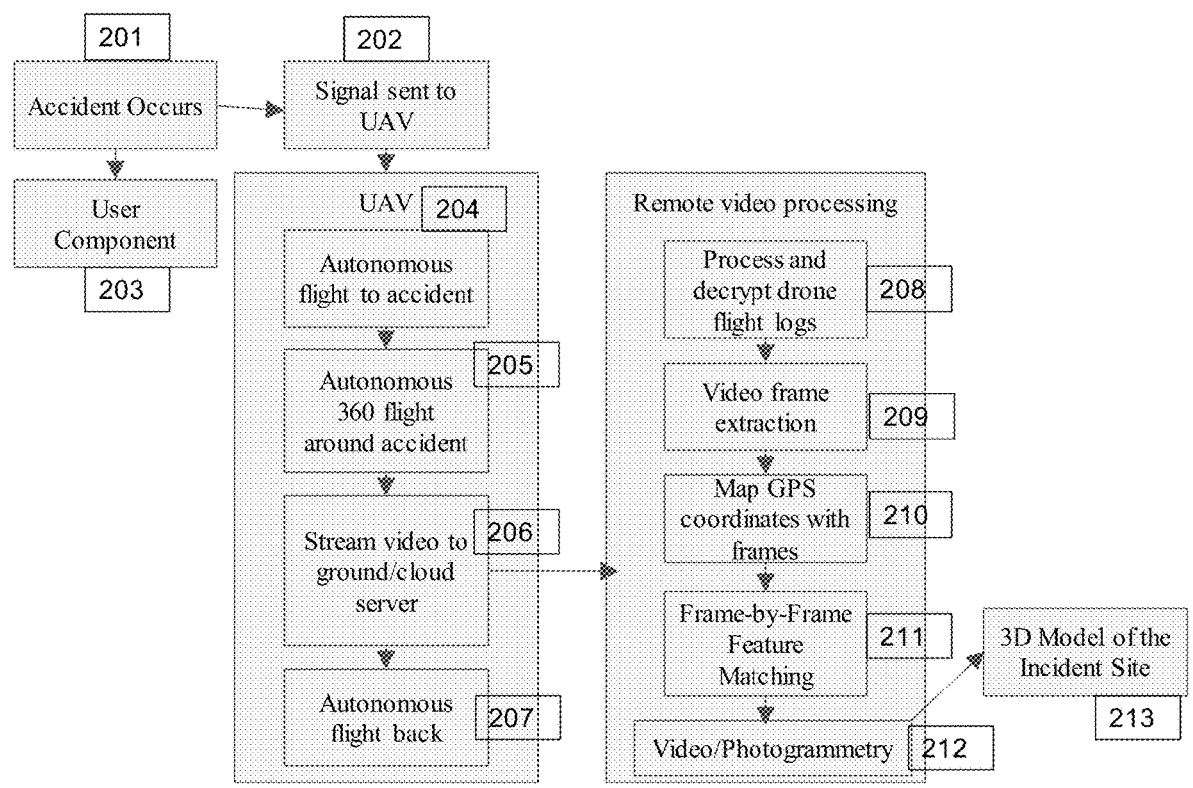
FIG. 2. Drone Video based 3D Incident Site Reconstruction Methods

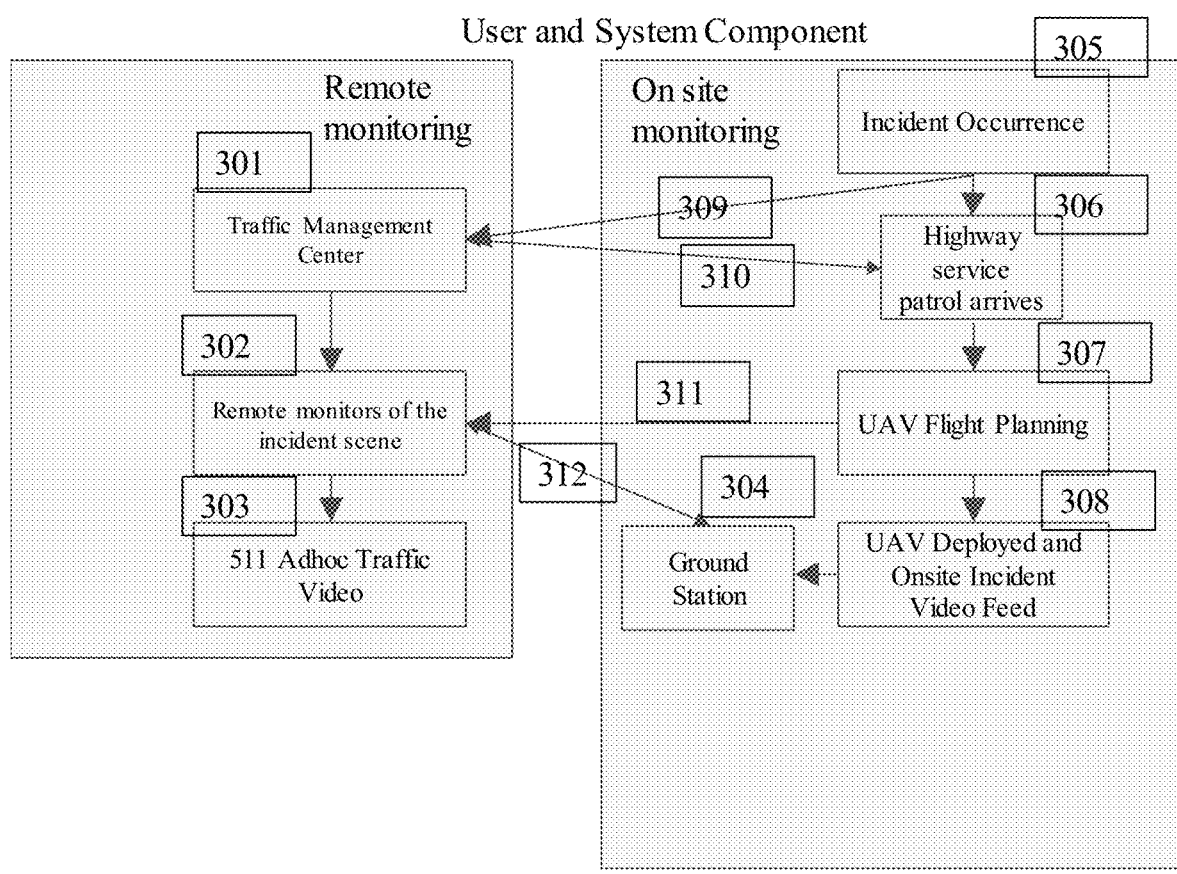
FIG. 3. Drone based Traffic Incident Management Support Methods

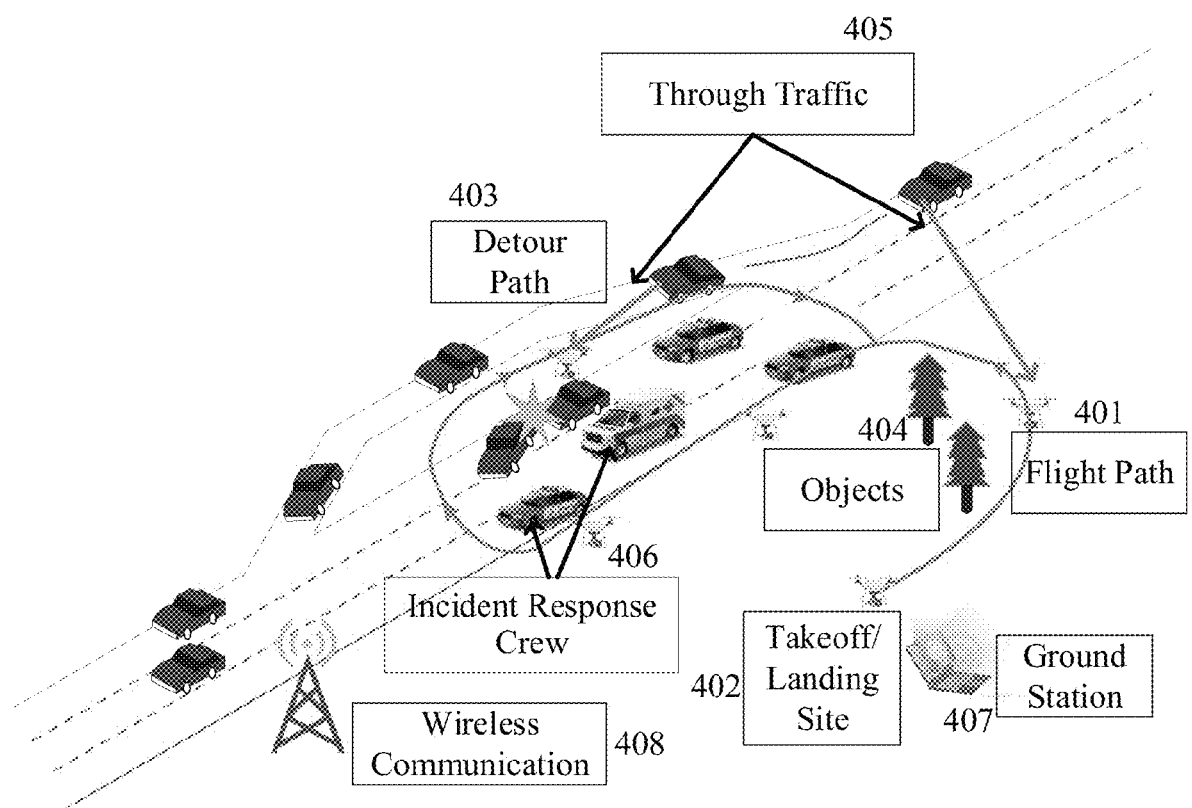
FIG. 4. Flight Path Planning and Control Methods

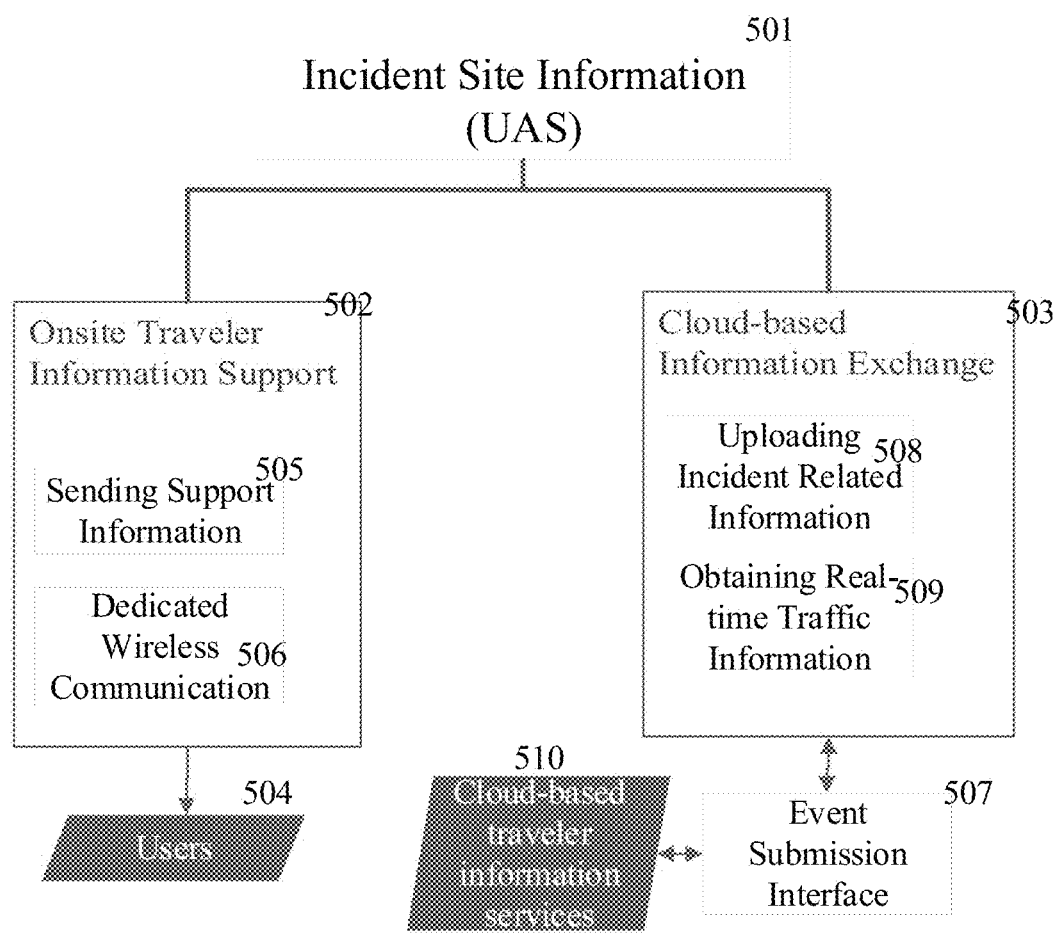
FIG. 5. UAS-based Incident Traveler Information Service Methods

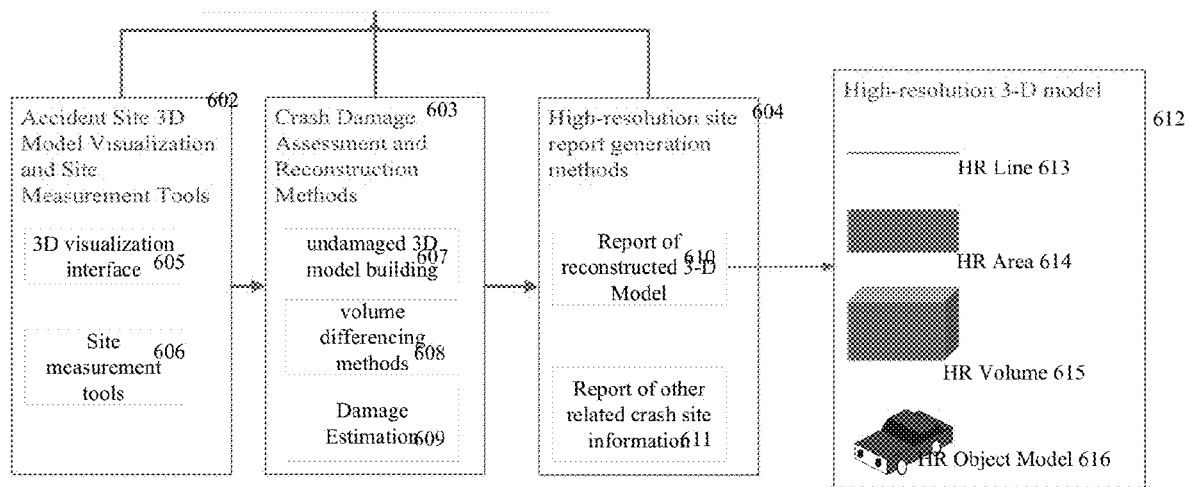
FIG. 6. UAS-based Accident Site Data Analytic Methods

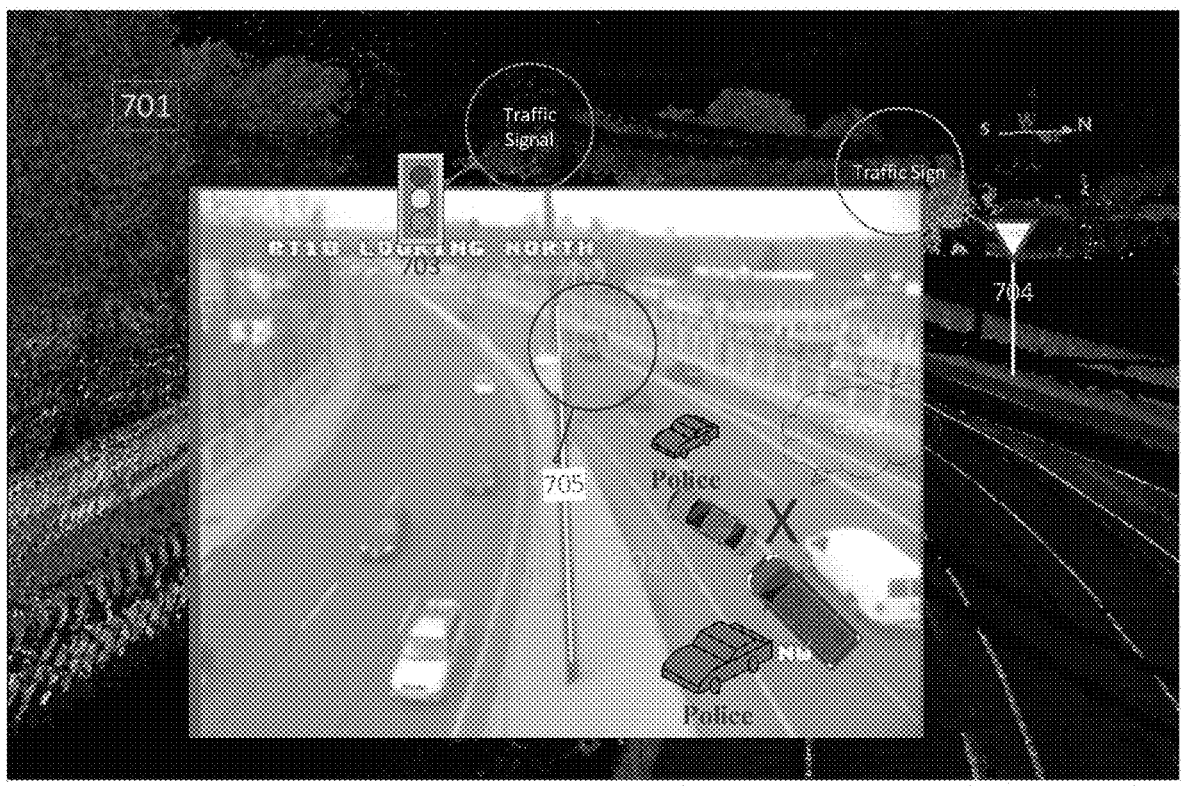
FIG. 7. 3D Infrastructure Data Pre-Collection and Site Positioning Methods

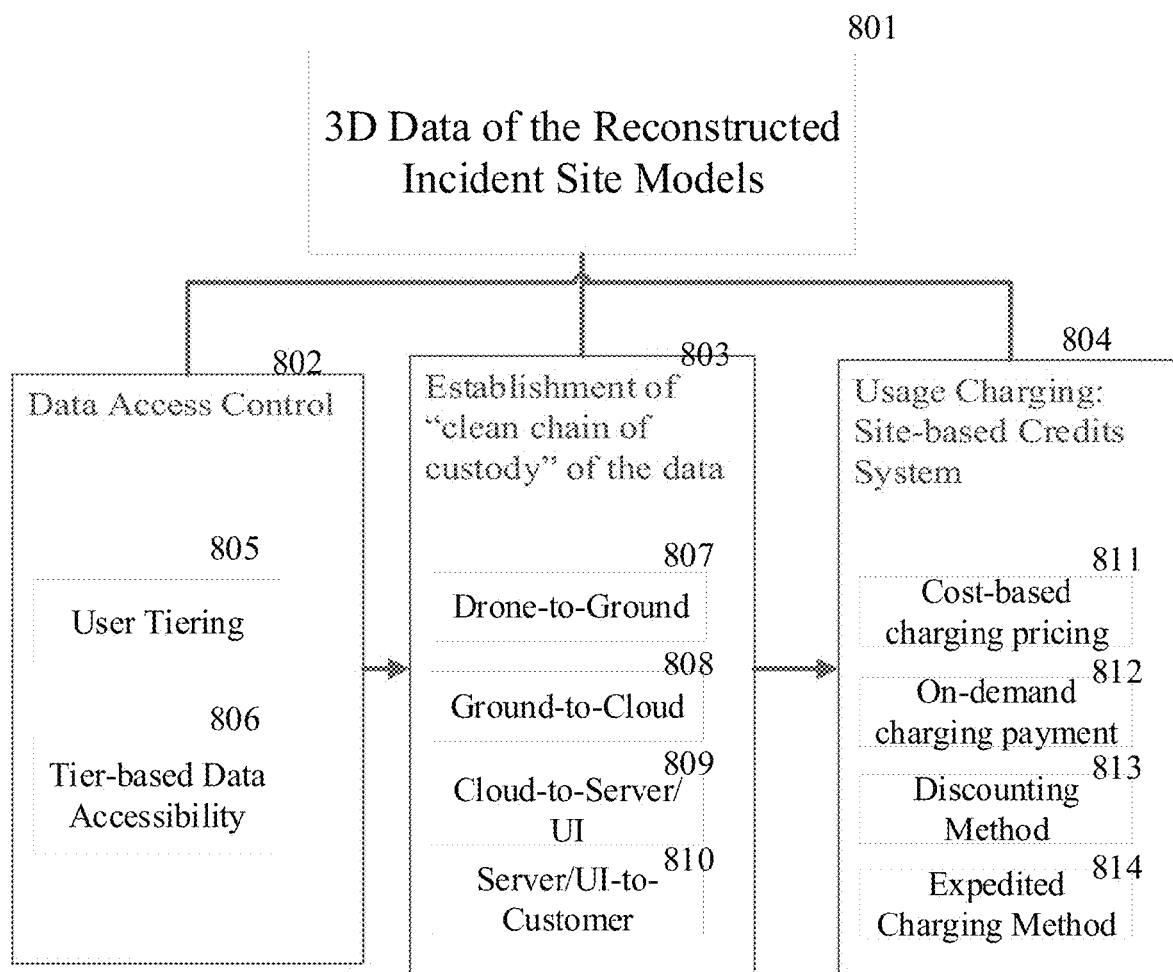
FIG. 8. 3D Model Data Access Management, Control and Charging Schemes

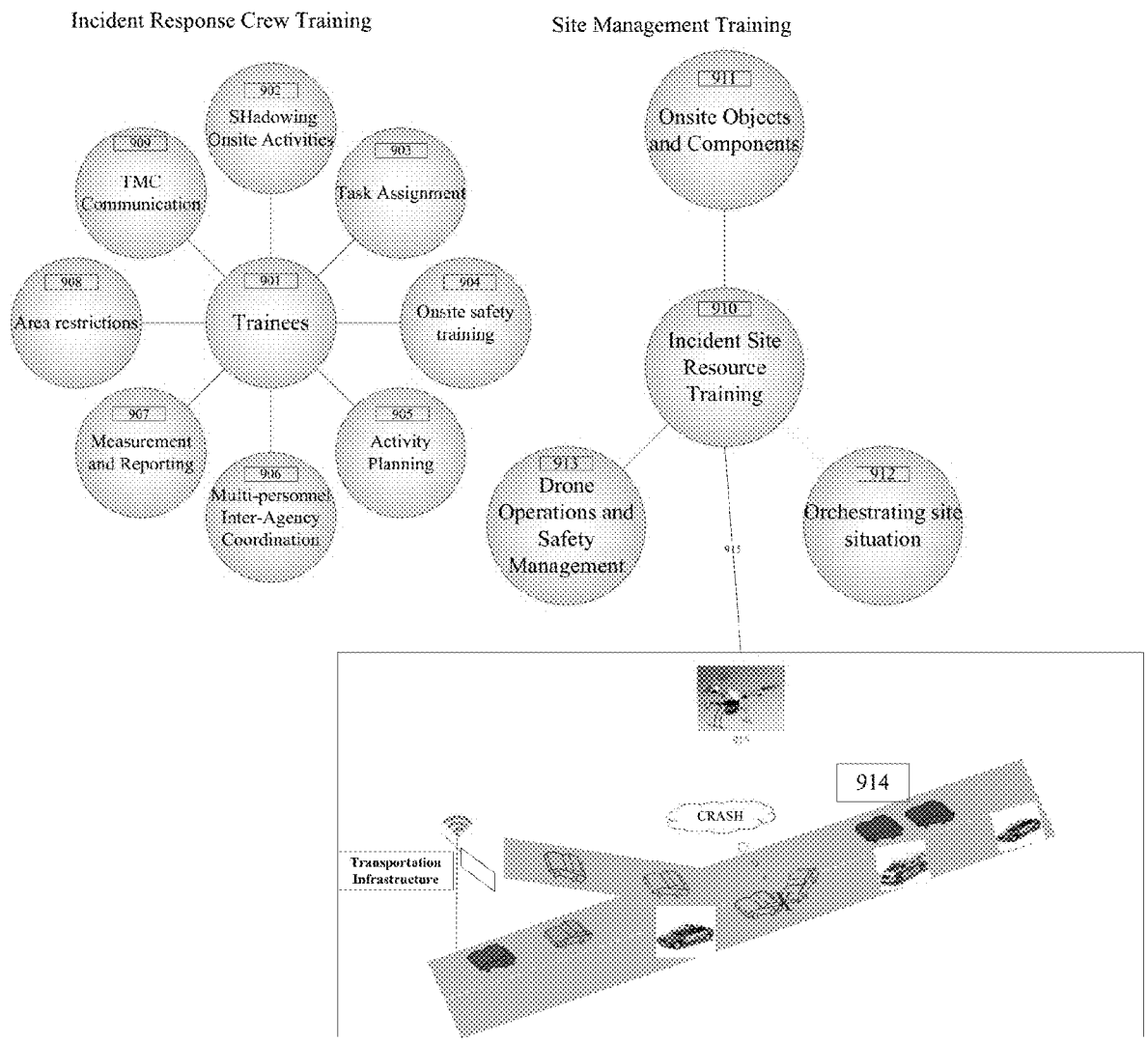
FIG. 9. 3D Model based Incident Management Training and Educational Methods ated in color. Copies of this patent or patent application
INCIDENT SITE INVESTIGATION AND MANAGEMENT SUPPORT SYSTEM BASED ON UNMANNED AERIAL VEHICLES

CROSS-REFERENCE TO RELATED APPLICATIONS

This application claims the benefit of U.S. Provisional Patent Application No. 62/544,461, filed Aug. 11, 2017, which is hereby incorporated by reference in its entirety.

FIELD OF INVENTION

Some embodiments relate to the application of using aerial data collection and decision support system for traffic incident management. More specifically, some embodiments focus on using the video and drone positioning data collected from UAV or drone flights to recreate the 3D model of the incident sites. Some embodiments also describes the methods of using the generated 3D model to generate incident reports, creating realistic virtual environment for training. Data management, access control, and usage charging methods are also described herein.

BACKGROUND

Incidents refer to non-recurrent traffic-impeding events such as accidents, road spills, stalled vehicles, and etc. This UAV-based platform belongs to the applications of using video and images for surveying and monitoring of roadway traffic and events.

SUMMARY OF THE INVENTION

Some embodiments provide a detailed UAV or Drone-based traffic incident site investigation and management support system design to provide sensing, data analytics, data dissemination, decision support, and training materials for incident response and management agencies. The aforementioned embodiments create an integrated drone-based hardware, software, cloud, and management solutions.

One UAV-based incident data collection and management support system focuses on a video-based fast 3D reconstruction with high-resolution (4 k) video of incident scene with a continuous unstopped flight patterns. The platform can be used to significantly accelerate the site data collection, the incident information dissemination, and traffic incident management operations. Said system can improve the data quality, efficiency, safety, integrity, and communication in traffic incident.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 1 presents the architecture of one embodiment of a drone-based incident investigation and management support system.

FIG. 2 presents the an embodiment of a video-based 3D reconstruction method.

FIG. 3 presents an embodiment of traffic management support methods.

FIG. 4 presents an embodiment of Flight Path Planning and Control Methods.

FIG. 5 presents an embodiment of UAS-based Incident Traveler Information Service Methods.

FIG. 6 presents an embodiment of UAS-based Accident Site Data Analytic Methods.

FIG. 7 presents an embodiment of 3D Infrastructure Data Pre-Collection and Site Positioning Methods.

FIG. 8 presents an embodiment of 3D Model Data Access Management, Control and Charging Schemes.

FIG. 9 presents an embodiment of 3D Model based Incident Management Training and Educational Methods.

DETAILED DESCRIPTION

I. Legend to the Drawings

FIG. 1:
  101: UAS incident data collection platform
  102: UAS ground control station
  103: Incident information for traveler information services
  104: Incident data analytic and training center
  105: Incident operations with Traffic Management Centers (TMCs)
  106: In-Vehicle On-board Devices that can receive the onsite incident information broadcasting
  107: Cloud traveler information services such as WAZE, Inrix, and Google Traffic
  108: Video-based 3D incident modeling methods
  109: Data Visualization and Management Interface
  110: Traffic Incident Management Training
FIG. 2:
  201: Incident occurrence
  202: Incident alerts
  203: Traveler self-recording interface
  204: Autonomous flight patterns
  205: Autonomous survey patterns
  206: Video streaming services to the cloud analytic server
  207: Autonomous return flights
  208: Drone flight log extraction
  209: Video frame extraction
  210: Video frame positioning with flight log GPS records
  211: Frame-by-frame feature filtering and matching
  212: Video- and Photogrammetry
  213: Generated 3D Model of the incident site
FIG. 3:
  301: Traffic Management Center (TMC)
  302: Remote video monitoring of the incident scene
  303: Traveler information service (511) temporary video feeds
  304: Onsite UAV ground station for flight planning, control, and wireless communication
  305: Incident occurrence
  306: Highway service patrol (HSP) response crew
  307: UAV Flight Planning at the incident site
  308: UAV deployment and the establishment of onsite video feed
  309: TMC detects incidents through cellphone calls or traffic detectors
  310: TMC coordination with HSP vehicles and crews
  311: TMC feedback on UAV flight and observation positions
  312: Onsite video transmission through wireless communication and remote UAV path and camera angle adjustment
FIG. 4:
  401: UAV Automated Flight Path
  402: UAV Takeoff and landing site
  403: Temporary Traffic Diversion and Detouring Paths 404: Objects onsite that may affect the autonomous flight path design
405: Through traffic detoured or affected by the incident
406: Incident Response Crew including police, medical, and highway service patrol crew
407: UAV ground station for flight control and video quality monitoring FIG. 5:
501: Incident data collected from the site by UAS and response crew
502: Onsite Traveler Information Support
503: Cloud-based Information Exchange
504: Users
505: Sending Support Information
506: Dedicated Wireless Communication
507: Event Submission Interface
508: Uploading Incident Related Information
509: Obtaining Real-time Traffic Information
510: Cloud-based traveler information services FIG. 6:
601: UAS-based Accident Site Data Analytic Methods
602: Accident Site 3D Model Visualization and Site Measurement Tools
603: Crash Damage Assessment and Reconstruction Methods
604: High-resolution site report generation methods
605: 3D visualization interface
606: Site measurement tools
607: Undamaged 3D model building
608: Volume differencing methods
609: Damage Estimation
610: Report of reconstructed 3-D Model
611: Report of other related crash site information
612: High-resolution 3-D model
613: HR Line
614: HR Area
615: HR Volume
616: HR Object Model FIG. 7:
701: Pre-collected 3D Infrastructure Model
702: 3D infrastructure site data
703: Traffic light
704: Traffic Sign
705: Light Pole FIG. 8:
801: 3D Data of the Reconstructed Incident Site Models
802: Data Access Control
803: Establishment of "clean chain of custody" of the data
804: User Charging: Site-based Credits System
805: User Tiering
806: Tier-based Data Accessibility
807: Drone-to-Ground
808: Ground-to-Cloud
809: Cloud-to-Server/UI
810: Server/UI-to-Customer
811: Cost-based charging pricing
812: On-demand charging payment
813: Discounting Method
814: Expedited Charging Method FIG. 9:
901 Incident Site Reconstruction-based Crew Management Training Methods
902 Onsite Shadowing
903 Onsite task assignment and coordination
904 Onsite safety training
905 Onsite activity sequence planning and path selection
906 Measurement and reporting training
907 Multi-Personnel and Inter-Agency coordination and communication
908 Area restriction awareness and risk assessment
909 Communication with traffic management center regarding onsite conditions
910 Incident Management Onsite Activity and Resource Management Training Methods
911 Identifying and Marking Various Onsite Objects
912 Orchestrating site situation for resource management training
913 Drone related training
914 Incident site screening and traffic control
915 Incident Management Onsite Activity and Resource Management Training at Real Incident Traffic Scene II. Description of Embodiments FIG. 1 shows the entire system architecture of one embodiment. The system comprises five major components. The incident data collection platform 101 will be deployed at the incident site and is equipped with the drone and the high-resolution video sensors and other optional sensors (e.g. light airborne LiDAR sensors) carried by the drone. The ground station 102 includes computers, tablets, smartphones, and/or drone and camera controllers, the flight planning software or mobile application to design and upload automated flight paths to the drone, video monitoring system, and wireless communication modules to receive and replay the video through cellular network to traffic management center and data analytic cloud. The traveler information service interface 103 disseminates the incident related information such as location, severity, traffic patterns, congestion, and detouring information to both the on-board devices of nearby vehicles 106 through cellular, WiFi, or DSRC (Dedicated Short-Range Communication) connectivity and also exchange information with the cloud traveler information services such as WAZE, Inrix, HERE(Nokia), Google Traffic 107. The data analytic and training center (104) includes a cloud-based 3D model reconstruction module 108, incident reporting and analysis interface 109, and the virtual reality (VR) based training interfaces 110. The interface with Traffic Management Center (TMC) allows the coordination between TMC operators and onsite crew and the real-time video collected by the system will be transmitted to TMC for monitoring the progress of the incidents.

The incident data collection platform comprises a drone equipped with a video system and one or more sensors. The one or more sensors may include LiDAR and other sensors. The drone may include an observer/surveying unit and an operating unit. The drone may include a U2V communication unit for communicating with traveler information service 103. The drone may include a flight control and communication that transmits and receives electronic messages from the ground station 102. Drone may receive flight control signals from the ground station that are processed by a processor of the drone to control one or more motors or actuators on the drone to control a flight path. A data analytics and training center 104 may use information from a ground station 102. The data analytics and training center 104 may include incident site and event extracting and processing, a visualization interface with survey and analysis, training, and public information services, and photogrammetry of LiDAR 3D model reconstruction. Photogrammetry or videogrammetry may comprise identifying locations of points by comparing the locations of an object in one or more frames of video. The data analytics and training center 104 may include pre-collected LiDAR and road inventory data, which may comprises data that was previously collected using LiDAR to identify the locations of objects. Video frame geotagging may be used to add geotags to video frames and image geotagging may be used to add geotags to images.

FIG. 2 depicts the methods of generate the 3D model of the incident site from the video data. Once the incident occurred 201, travelers can report the incidents to cloud services to alert TMCs 203. User input is collected from user components. A signal is sent to the UAV about the incident 202. The incident alerts 204 will be evaluated and confirmed by TMC and response crew will be sent to the incident site to start the data collection. There are several methods in this process. The first method is the automated flight path design and autonomous flight which includes the flight from the takeoff/landing site to the incident location 204, a software package that defines the autonomous incident survey patterns based on the user entered incident location and POI (Point of interests) information 205. The UAV performs a survey around the incident site, which may include a 360 degree flight around the incident site. The collected video along with flight log data (containing coordinates) will be transmit to the cloud services 206 to conduct the 3D reconstruction modeling. The video is collected by the video system on the UAV and transmitted using, for example, a wireless transmission method. The UAV then returns to its base. The flight will be concluded with automated landing process 207. Once the video is in the cloud server, the detailed video and flight log processing will start. A software package will first process and decode the flight logs 208. Different decoders will be developed for different brands of drones. Video frame will be extracted along with its timecode data 209. The extracted video frame will then be matched with the drone location at the time of the video frame interpolated from the flight logs. Then the video frames from adjacent time intervals will be matched together to find common features. Consecutive frames are examined to match features common to the consecutive frames to identify a feature corresponding to a feature in the real world. A feature motion tracking will be conducted to rapidly match features cross consecutive video frames 211. Features may be identified using descriptors, such as SIFT, and other artificial intelligence methods, such as neural networks. Then a video or photogrammetry procedure will be conducted 212. The matched features are then processed through triangulation and 3D reconstructing process to be vertexes of the 3D model. Triangulation identifies coordinates of a feature in 3D space by using a plurality of signal points, which may correspond to a plurality of frames of video. Then the mesh and surface of the 3D model of the incident site will be generated. A mesh is generated from the triangulated points. Then surface smoothing is performed on the mesh. The end result is the created 3D model of the incident site 213.

FIG. 3 shows the communication methods between the onsite platform and TMC. The communication include the remote monitoring at TMC 301 and onsite monitoring at the incident sites. Remote monitoring may be performed by human users or by automated systems, such as neural networks. Once an incident occurs 305, the event may be detected by TMC 309 with cellphone calls, CCTV monitoring, or traffic detectors. The TMC may detect the incident by monitoring for spikes of activity or one or more features characteristic of an incident. Highway service patrol (HSP) crew with the drone platform 306 can coordinate with TMC 310 and respond to the incident scene. The drone operators from the HSP crew will conduct initial flight planning 307. Communication can be established between TMC and drone team 311 to make adjustment to the flight patterns. Then the drone will be deployment and start collecting video data 308. The drone video will be transmitted to the ground station 304. The work stations, tablets, or smartphones at the ground station 304 will use the cellular or WiFi connections to relay the video to the TMCs 312 for displaying in the video walls to monitor the incident scene remotely 302. TMC can publish the temporary Adhoc traffic video of the incident through traveler information website e.g. 511 website if deemed publishable 303.

FIG. 4 shows the basic flight path planning and control methods. Before the flight, flight path planning (401) needs to be designed with user inputs of surrounding environments including site geometry, ground crew locations (406), risk and distraction level of drivers. In an embodiment, the flight path is generated automatically from these inputs based on a flight path planning algorithm. Meanwhile, the Detour Path (403) is determined by pre-populating both static infrastructure and user-input onsite objects (404) and restrictions for any changes to the flight planning software. User-input onsite objects may be received from user interface components and may be provided by data indicating the existence and location of one or more objects at the incident site. During the flight, the UAV first take off from the Takeoff Site (402), and then the distraction reduction is achieved by rising UAV quickly and away from lines of sight of through traffic (405). The flight path planning algorithm may automatically determine the appropriate flight path to move the UAV quickly and away from lines of sight of drivers at or near the incident location. The ground station (407) will implemented software package that continuously checks on glares and image stability, and automatically adjust the speed and position of UAV to optimize the video quality. The ground station may transmit one or more control signals to the UAV to control the UAV's movements as described.

FIG. 5 shows the UAS-based incident traveler information service methods 501 which comprises of onsite traveler information support 502 and cloud-based information exchange 503. The onsite traveler information support 502 sends support information 505 such as incident information, diversion alerts, images of site and congestion etc. to users 504 through dedicated wireless communication 506 such as by text, image, or sound notification. The cloud-based information exchange 503 enables uploading and updating incident related information 508 to cloud-based traveler information services 510 such as Google maps, Waze, etc. through event submission interface 507, and it also enables obtaining real-time traffic information 509 from 510 to determine the potential travel recommendations.

FIG. 6 shows the UAS-based accident site data analytic methods 601 comprising of accident site 3-D model visualization and site measurement tool 602, crash damage assessment and reconstruction methods 603, high-resolution site report generation methods 604. 602 provides a 3-D visualization interface 705 for the site measurement tool 706. 703 consists of undamaged 3-D model building 607. In an embodiment, an undamaged 3D model is built of each vehicle involved in the event at the incident site, where the 3D model represents the vehicle in its undamaged state. Based on 607, a point cloud volume differencing method 708 is implemented to calculate the volume loss and evaluate the potential damaged vehicle components 609. The point cloud volume differencing method 708 compares the 3D models as generated after the even with the corresponding undamaged 3D models. The difference in volume between the corresponding pairs of models is calculated.

604 generates a report of reconstructed 3-D model 610 which consists of high resolution 3-D model 612 including high-resolution (HR) line 613, HR area 614, HR volume 615, and HR object model 616. 604 also generates report of other related crash site information 611 based on other environmental information.

FIG. 7 shows that pre-collected 3D infrastructure model 701 containing static infrastructure elements, such as lane marking, traffic light 703, traffic sign 704, and light pole 705. Site infrastructure data collected in real time will be processed to match with pre-collected infrastructure model through positioning and rescale. The static infrastructure model and site infrastructure model will be combined to recreate contextual view of the incident and visualization.

FIG. 8 shows the 3-D model data access management control and charging schemes 801. 901 comprises of data access control method 802, establishment of "clean chain of custody" of the data 803, and the user charging system 804. The data access control method 802 classifies the potential users to different tiers 805, and grants different accessibility of the details of the data to different tiers of users 806. 803 secures the data transferring between the system components such as drone-to-ground 807, ground-to-cloud 808, cloud-to-server/UI 809, and server/UI-to-customer 810. 804 includes a cost-based charging pricing method 811 to determine the price per onsite data collection complexity as well as the data transferring and processing complexity. 804 also includes an on-demand charging payment component 812 which allows users pay in diversified ways such as Pay-per-site-area, Pay-per-accident-severity, Pay-per-report-details, subscription type, etc. 804 also includes a discounting method 813 and an expedited charging method 814 to determine the charging discount and potential additional fee for expedited services.

FIG. 9 illustrates the training and educational methods with the generated 3D incident site model. The methods include two major categories, one is incident site reconstruction-based crew management training methods 901, the other is incident management onsite activity and resource management training methods 910. Reconstruction-based crew management training methods will load the 3D models of incident sites into VR(Virtual Reality), AR (Augmented Reality) or CAVE (cave automatic virtual environment) or 360 video environment for trainees to experience and practice. Trainees can perform onsite shadowing in which trainee follows an onsite crew to investigate and mimic their activities in the actual site as recorded by onsite video 1002, onsite task assignment and coordination training 1003, onsite safety training 1004, onsite activity sequence planning and path selection 1005, measurement and reporting training 1006, multi-group interagency coordination and communication 1007, the onsite functional area awareness and risk assessment and mitigation training 1008, and the communication training with traffic management center regarding onsite conditions 1009. Incident site resource management training methods 910 can be conducted by establish the details of incident site in a VR, AR, CAVE, or 360 video environment to train the recognition of critical onsite objects 1011, resource (e.g. police and emergency vehicles, workstations, measurement and survey equipment) allocation and positioning training 1012, site screening and traffic control training 1013, and drone planning and operations training including the playback of drone trajectories, drone safety assessment and risk mitigation, 1013.

The following exemplary embodiments represent some systems and methods that may be used consistent with the embodiments described above.

1. A UAV-based incident site investigation and management support system consists of the follow platforms and subsystems
   a. Flight planning and mission control platform for flight path design to execute safe and efficient autonomous surveying path around an incident site;
   b. UAV-based high-resolution video and location sensor system to collect site data for 3D reconstruction;
   c. 3D modeling and analytic system based on videogrammetry with high-resolution location-tagged video frames to create the 3D reconstruction of the incident sites
   d. Data dissemination and communication system for real-time receipt of incident site information and transmission to traffic management center or traveler information system,
   e. Visualization, reporting, and training platforms based on the generated 3D model of the incident site, 2. An incident site reconstruction Drone Video-based Incident Site Investigation Methods comprising of the following key computational steps
   a. high-resolution (4 k+) video frame extraction,
   b. video frame-by-frame geotagging with the GPS flight logs from the drone,
   c. frame-to-frame common feature extraction and matching,
   d. feature triangulation and 3D reconstruction,
   e. mesh building and surface smoothing,
   f. onsite 3D model preview with coarse resolution,
   g. cloud-based 3D model reconstruction for high-resolution modeling.

3. The method of conducting remote video monitoring of the incident site from the traffic management centers (TMCs) through the UAV incident site investigation and management support system of enabling two-way communication methods between TMCs and incident site as follows
   a. Uplink to TMC method of transmitting the incident site video collected by UAVs to TMC video wall through a video relaying services established at the ground station with cellular communication
   b. Downlink back to incident site methods of establishing control command to allow TMC operators to conduct pan-tilt-zoom actions on the UAV and its cameras to monitor critical locations and spots at the site.

4. A flight path planning and control methods for UAV incident site investigation to ensure safety, efficiency, and data quality comprising of flight planning, flight control, object avoidance, distraction reduction, and in-flight video quality assessment and control.

4.1 The methods of flight path planning that customizes flight patterns to 1) cover the entire site based on site geometry that may affect the flight contour and lines of sight restrictions; 2) to establish standard the takeoff and landing places, flight heights, and paths to avoid static and moving objects and people onsite but to allow complete and clear data collection; 3) to establish sufficient escaping room in the pattern to mitigate potential risk and liability of the flight so that the paths avoid hitting people, high-priced equipment etc. even during drone failures; 4) to adjust the fly speed, altitude and position to minimize the distraction level of drivers to reduce the impact to traffic on the same and opposing directions.

4.2 An object avoidance method of avoiding objects such as trees and infrastructures by pre-planning the detailed flight path points by pre-populating both static infrastructure and user-input onsite objects and restrictions for any changes to the flight planning software for calculating 3D trajectories to pass safely through those objects;

4.3 A distraction reduction method that minimizes the distraction of drivers on both traveling lanes and the opposing lanes by pre-planning the flightpath that rises quickly and away from view of drivers in high-speed vehicles (e.g. opposing or thru traffic).

4.4 The methods of in-flight assessing and controlling of video quality, as described in claim 2b, including the glare detection and adjustment of camera angles or flight paths and the image stability assessment and the adjustment of speed and position to stabilize the video scene.

5. UAS-based incident traveler information service methods of disseminating incident information to nearby vehicles through their onboard connected vehicle devices and exchanging information with cloud traveler information services.

5.1 The onsite traveler information support method of sending incident information, diversion alerts, images of site and congestion etc. to travelers in ways of text, image, and voice notification based on the data collected by onsite UAS through connected vehicle communication (DSRC) or other wireless communication such as 4G-LTE and Wi-Fi.

5.2 The methods of exchanging information between UAS and cloud-based traveler information services include both the uplink and downlink methods as follows
  a. Uplink: uploading and updating the incident related severity, congestion, and diversion information to cloud-based traveler information services through event submission interfaces
  b. Downlink: obtaining real-time traffic information from those cloud services to determine the potential travel recommendations for the incident or accidents including the optimal diversion routes, diversion locations upstream, and the impact road network.

6. The methods of visualizing, analyzing, and conducting traffic and activity simulation with the reconstructed 3D incident site model.

6.1 The methods of visualizing 3D model of accident site and measuring site includes a 3D visualization interface and measurement tools on 3D models as follows
  a. The 3D visualization interface of the entire accident site within the background of colored 3D LiDAR model pre-collected as described in claim 7.1 or street-view environment.
  b. Site measurement tools, including line, area, surface, comparison, etc., that can measure tire marks, distance, vehicle geometry, impact area, volume, surface curvature to assess incident damages.

6.2 The methods of crash damage assessment and reconstruction Methods
The methods of assessing the severities and damaged components of the crashed vehicles based on 1) the undamaged 3D model building with the dimensions obtained for the vehicle models involved, 2) the volume differencing methods to comparison and visualize between the reconstructed 3-D model of the vehicles and the undamaged models, and 3) calculation of the volume loss and affected potential vehicle components at the damage location.

6.3 The methods of generating the incident site data with the reconstructed 3D model with measurement tools for the followings
  a. High-resolution line with point-to-point data in 3-D point cloud;
  b. High-resolution area enabling drawing and selecting points to set the are boundary in 3-D point cloud;
  c. High-resolution volume showing undamaged object template as 3-D point cloud;
  d. High-resolution object model combined with static 3-D infrastructure model as described in claim 8;
  e. Other environmental data such as weather, surrounding environment, driver/roadside view of collision, illumination, etc. by integration of detected video image scenery information with other environment data sources (e.g. weather, sun position etc.).

7. The methods of establishing static 3D Infrastructure model and post-processing the reconstructed 3D incident site model to the scale and accurate geographical position.

7.1 The static 3D infrastructure data collection and modeling methods wherein said using pre-collected corridor data consisting of Mobile LiDAR to establish corridor static 3D Model and create geospatial indexes of critical infrastructure objects (mileposts, light poles, overhead gantries, traffic sings/signals) for further positioning site recreation purpose.

7.2 3D Infrastructure site data positioning and overlaying methods of repositioning and rescaling of the reconstructed 3D model by matching the infrastructure features within the 3D model with the static 3D model, and merging the 3D model with the pre-processed 3D static infrastructure model to create the comprehensive view with upstream, downstream and surrounding scenes for the incident modeling and visualization.

8. The methods of managing the access, maintaining the chain of custody, and charging schemes for the reconstructed 3D Model Data.

8.1 The method of controlling the access of the 3-D model data by different limitation of delivering data between different tiers of users regarding the accessible level of details:
  a. Tier 1 users including Public Safety Department, Transportation Safety/Management Agencies, and Incident Response Team who can get access of the High-resolution 3-D models with full details for reporting, analysis, and training;
  b. Tier 2 users including Insurance/Medical Companies who can get access of the report and 3-D model of detailed damaged vehicle parts/infrastructures for damage/liability assessment;
  c. Tier 3 users including travelers involved in crash who can get access of the detailed damage reports, 3D view of incident site, and images for insurance claims and legal disputes;
  d. Tier 4 users including other travelers, data analytic agency departments and consulting companies who can get access of anonymized, aggregated data and crash reports, per request/purchase.

8.2 The method of controlling the distribution of 3-D model data by the establishment of a "clean chain of custody" between data transferring nodes to ensure the data security and track the whole process of data transferring and retrieving as:
  a. Drone-to-Ground: A encrypted data transferring link between UAS and ground units with dedicated communication frequency and frequency-jump technique;
  b. Ground-to-Cloud: A secured and encrypted data flow through cellular/Wi-Fi communication with digital signature/authentication and data validation;
  c. Cloud-to-User Server/Interface: A private password-protected access-controlled interface to ensure the security of data and reports;

d. User Server/Interface-to-Customer: A computer/server authorization process at the time of software installation.

8.3 The method of managing the user charge comprising of:
a. Cost-based pricing tiers based on
the cost of onsite collection per the data volume, site area, computational level, and time sensitivity;
the cost of data/report retrieval per the data volume, accuracy and level of details needed by users, insurance companies, medical providers, and other agents.
b. On-demand charging payment style including Pay-per-site-area, Pay-per-accident-severity, Pay-per-report-details, subscription type, etc.
c. Payment discounting method such as user-type-discount, subscription length discount, bulk credit purchasing, incident severity, etc.
d. Expedited charging method of charging an additional processing fee for expedited services required by users.

9. The methods of training of incident response crew members and the resource management during incidents by integrating the reconstructed 3D incident site into the virtual reality environment and the recorded onsite activities to create the high-resolution immersive and interactive view of the incident site.

9.1 The methods of training incident response crew members by the 3D model to create a immersive visualization of an actual incident site and building a virtual reality training environment to learn onsite task assignment, reporting and measurement, onsite safe/efficient movement, shadowing with actual response crew's activities, the coordination and communication among team members, among agencies, and with TMCs, personnel requirement for area access at the site, etc.

9.2 The methods of incident management onsite resource management training method will utilize various onsite objects, including vehicles, tape measure, rescue vehicles, other equipment to assist officer in training to efficiently cope with incidents regarding site-staging, plan drone operations takeoff/landing site, drone flight path replay, drone safety training, traffic diversion and staging systems.

What is claimed:

1. An incident site investigation and support system comprising:
    a flight planning system configured to determine a flight path to an incident site and for surveying the incident site, the flight path under autonomous control;
    a video system on an unmanned aerial vehicle (UAV) configured to collect site data;
    one or more location sensors on the UAV configured to collect site data;
    a 3D modeling system configured to perform videogrammetry on a plurality of video frames collected from the video system to create a 3D reconstruction of the incident site, the plurality of video frames being tagged with a location;
    a data dissemination system configured to receive incident site information in real-time and transmit data to a traffic management center or traveler information system;
    a visualization system configured to display a visualization of the incident site based on the 3D reconstruction of the incident site;
    a reporting system for reporting data about the incident site based on the 3D reconstruction of the incident site;
    a training platform for training crew members in activities performed at the incident site.

2. An incident site reconstruction method comprising:
    a. extracting a plurality of video frames with 4K resolution or greater, where 4K resolution comprises a horizontal resolution of 3,840 pixels;
    b. geotagging each of the plurality of video frames with Global Positioning System (GPS) coordinates from GPS flight logs of a drone;
    c. identifying one or more common features in consecutive frames of the plurality of video frames by matching features between frames and extracting said one or more common features;
    d. determining location of the one or more common features by triangulation and using the determined locations to generate a 3D reconstruction of the one or more common features;
    e. building a mesh based on the 3D reconstruction;
    f. performing surface smoothing on the mesh to generate a 3D model;
    g. displaying a 3D model preview that is a lower resolution than a full resolution of the 3D model with a selected partial portion of an image and location tag dataset;
    h. generating a high-resolution 3D model at a cloud server with a complete image and location tag dataset.

3. The system of claim 1 further comprising:
    an uplink to a traffic management center (TMC) for conducting remote monitoring of the incident site, the uplink configured to transmit a video of the incident site collected by the drone to a video wall at the TMC, the uplink configured to transmit through a video relaying service provided at a ground station with cellular communication;
    a downlink from the TMC, the downlink configured to receive a plurality of control signals from the TMC to control pan, tilt, and zoom actions of a video system of the drone.

4. The method of claim 2, further comprising:
    flight planning for the drone to determine a flight plan, wherein the flight plan reduces distraction of drivers in an environment external to the drone;
    performing flight control of the drone to comply with the flight plan;
    performing object avoidance by the drone;
    assessing and controlling quality of video captured by the drone.

5. The method of claim 2, further comprising:
    customizing a flight plan of the drone to cover an incident site based on a geometry of the incident site and identifying at least one line of site restriction between the drone and the incident site;
    identifying a takeoff location, a landing location, a plurality of flight altitudes, and one or more flight paths for avoidance of one or more objects at the incident site and collection of data;
    adjusting a speed, altitude, and position of the drone based on reducing distraction for one or more drivers at the incident site or on the way to the incident site.

6. The method of claim 2 further comprising:
    accepting user input indicative of objects at an incident location;
    providing coordinates of static infrastructure in an environment;
    determining by flight planning software 3D trajectories for the drone to avoid objects at the incident location and the static infrastructure.

7. The method of claim 2 further comprising:
pre-planning a flight path of a drone to cause the drone to rise quickly and away from the view of one or more drivers at the incident site.

8. The method of claim 2, further comprising:
detecting glare;
adjusting a speed and position of the drone to stabilize a video collected by the drone.

9. The system of claim 1, further comprising:
a traveler information service configured to transmit information about an incident to a plurality of vehicles near the incident site.

10. The system of claim 1, further comprising:
a traveler information service configured to transmit incident information, diversion alerts, and a plurality of images of the incident site to one or more travelers through wireless communication.

11. The system of claim 1, further comprising:
an uplink configured to receive uploaded information about an incident severity, traffic congestion, and traffic diversion to a cloud-based traveler information service through an event submission interface;
a downlink configured to obtain real-time traffic information from the traveler information service to determine travel recommendations and transmit the travel recommendations to one or more users.

12. The system of claim 1, wherein the visualization system is configured for visualizing, analyzing, and performing traffic simulation using the 3D model.

13. The system of claim 1, wherein the visualization system is configured for visualizing the 3D model; and
providing a 3D visualization interface including site measurement tools.

14. The system of claim 1 further comprising:
a damage assessment model configured to receive an undamaged 3D model to represent the undamaged state of each vehicle involved in an incident at the incident site;
the damage assessment model configured to perform volume differencing to compare and visualize the volume difference between the 3D model and the undamaged 3D model;
the damage assessment model configured to calculate the volume loss and determine one or more affected vehicle components.

15. The system of claim 1 further comprising:
an incident reporting service configured to provide measurement tools for incident reporting based on the following:
one or more lines with point-to-point data in a 3D point cloud;
an interface area allowing for drawing and selecting points to set a boundary in the 3D point cloud;
a volume showing an undamaged object template as a 3D point cloud;
an object model; and
environmental data.

16. The method of claim 2 further comprising:
overlaying a static 3D infrastructure model.

17. The method of claim 2 further comprising:
collecting 3D infrastructure data;
creating geospatial indices of infrastructure objects.

18. The method of claim 2 further comprising:
repositioning and resealing the 3D model by matching one or more features of the 3D model with one or more features of a 3D infrastructure model.

19. The method of claim 2, further comprising:
controlling access to the 3D model, including providing different levels of access to different users.

20. The system of claim 1, further comprising:
an encryption and authentication system configured to encrypt communication links and authenticate data from LJAV video to a ground station.

21. The method of claim 2, further comprising:
providing a plurality of pricing tiers for use of the incident site reconstruction method;
the pricing tiers based on the amount of data collected by the drone.

22. The method of claim 2, further comprising:
providing a virtual reality environment, the virtual reality environment incorporating the 3D model, and providing recorded training activities.

23. The method of claim 22, further comprising:
providing virtual training activities for task assignment, reporting and measurement, efficient movement, and coordination.

24. The method of claim 22 further comprising:
providing virtual training activities for using and placing one or more objects at the incident site.

* * * * *